United States Patent
Fagiano et al.

(10) Patent No.: US 9,830,229 B2
(45) Date of Patent: *Nov. 28, 2017

(54) ADDING COOPERATIVE FILE COLORING PROTOCOLS IN A DATA DEDUPLICATION SYSTEM

(71) Applicant: INTERNATIONAL BUSINESS MACHINES CORPORATION, Armonk, NY (US)

(72) Inventors: Christophe Fagiano, Mouans-Sartoux (FR); Itzhack Goldberg, Hadera (IL); Michael Hirsch, Mazkeret Batya (IL); Frank Krick, Ockenheim (DE); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/972,085

(22) Filed: Aug. 21, 2013

(65) Prior Publication Data

US 2015/0058297 A1 Feb. 26, 2015

(51) Int. Cl.
*G06F 17/30* (2006.01)
*G06F 11/14* (2006.01)

(52) U.S. Cl.
CPC ................ *G06F 11/1453* (2013.01)

(58) Field of Classification Search
CPC ......... G06F 17/30067; G06F 17/30489; G06F 3/0641

USPC ....... 707/692, 722, 740, 780, 679, 646, 736, 707/758; 382/170, 239; 704/2; 705/1.1

See application file for complete search history.

(56) References Cited

U.S. PATENT DOCUMENTS

| | | | |
|---|---|---|---|
| 6,551,357 B1* | 4/2003 | Madduri | G06F 17/241 345/592 |
| 7,779,351 B2* | 8/2010 | Kalra | 715/247 |
| 2003/0050927 A1 | 3/2003 | Hussam | |
| 2003/0206657 A1* | 11/2003 | Way | G06T 9/005 382/239 |
| 2004/0261016 A1* | 12/2004 | Glass | G06F 17/30014 715/230 |
| 2005/0240393 A1 | 10/2005 | Glosson | |
| 2006/0122956 A1 | 6/2006 | Shimogori | |
| 2007/0011149 A1 | 1/2007 | Walker | |
| 2007/0022072 A1 | 1/2007 | Kao et al. | |
| 2007/0030528 A1* | 2/2007 | Quaeler et al. | 358/453 |

(Continued)

FOREIGN PATENT DOCUMENTS

| | | |
|---|---|---|
| CN | 102169491 A | 8/2011 |
| CN | 102831222 A | 12/2012 |

(Continued)

*Primary Examiner* — Jeffrey A Burke
*Assistant Examiner* — Thong Vu
(74) *Attorney, Agent, or Firm* — Griffiths & Seaton PLLC

(57) ABSTRACT

For adding cooperative file coloring protocols in a data deduplication system using a processor device in a computing environment, a preferred character is represented for file coloring in a file using a code selected from a multiplicity of codes that represent a variety of contexts. The original meaning of the preferred character is retained when representing the preferred character for the file coloring by the code selected from the multiplicity of codes.

24 Claims, 6 Drawing Sheets

(56) References Cited

U.S. PATENT DOCUMENTS

| | | | |
|---|---|---|---|
| 2007/0198275 A1* | 8/2007 | Malden | G06Q 10/10 705/1.1 |
| 2009/0198677 A1* | 8/2009 | Sheehy | G06F 17/30864 |
| 2010/0030798 A1 | 2/2010 | Kumar et al. | |
| 2010/0088334 A1 | 4/2010 | Wasserman et al. | |
| 2010/0153410 A1* | 6/2010 | Jin | G06F 17/30569 707/758 |
| 2010/0306412 A1 | 12/2010 | Therrien et al. | |
| 2011/0090237 A1* | 4/2011 | Shimamura | G06T 11/001 345/582 |
| 2012/0059662 A1* | 3/2012 | Huisman, Jr. | G06Q 30/02 705/1.1 |
| 2012/0150823 A1 | 6/2012 | Tofano | |
| 2012/0151438 A1* | 6/2012 | Bach | G06F 17/3012 717/120 |
| 2012/0173523 A1* | 7/2012 | Cheung | G06Q 50/18 707/736 |
| 2012/0173578 A1* | 7/2012 | Cheong | G06F 17/30616 707/780 |
| 2012/0197871 A1* | 8/2012 | Mandel et al. | 707/722 |
| 2012/0233135 A1* | 9/2012 | Tofano | 707/692 |
| 2013/0124523 A1 | 5/2013 | Rogers et al. | |
| 2013/0262386 A1 | 10/2013 | Kottomtharayil et al. | |
| 2013/0262410 A1 | 10/2013 | Liu et al. | |
| 2013/0304742 A1* | 11/2013 | Roman | G06F 17/30598 707/740 |
| 2014/0040916 A1* | 2/2014 | Balakrishnan | 719/313 |
| 2014/0188805 A1* | 7/2014 | Vijayan | G06F 11/1453 707/646 |
| 2014/0189680 A1 | 7/2014 | Kripalani | |
| 2014/0279927 A1* | 9/2014 | Constantinescu | G06F 17/30156 707/679 |
| 2015/0020068 A1 | 1/2015 | Garza et al. | |

FOREIGN PATENT DOCUMENTS

| | | |
|---|---|---|
| CN | 103020174 A | 4/2013 |
| CN | 103198119 A | 7/2013 |
| WO | 2013058747 A1 | 4/2013 |

* cited by examiner

US 9,830,229 B2

ADDING COOPERATIVE FILE COLORING PROTOCOLS IN A DATA DEDUPLICATION SYSTEM

BACKGROUND OF THE INVENTION

Field of the Invention

The present invention relates in general to computers, and more particularly to adding cooperative file coloring protocols in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of available data are copied, again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for adding cooperative file coloring protocols in a data deduplication system using a processor device in a computing environment. In one embodiment, by way of example only, a preferred character is represented for file coloring in a file using a code selected from a multiplicity of codes that represent a variety of contexts. The original meaning of the preferred character is retained when representing the preferred character for the file coloring by the code selected from the multiplicity of codes.

In another embodiment, a computer system is provided for adding cooperative file coloring protocols in a data deduplication system using a processor device, in a computing environment. The computer system includes a computer-readable medium and a processor in operable communication with the computer-readable medium. In one embodiment, by way of example only, the processor represents a preferred character for file coloring in a file using a code selected from a multiplicity of codes that represent a variety of contexts. The original meaning of the preferred character is retained when representing the preferred character for the file coloring by the code selected from the multiplicity of codes.

In a further embodiment, a computer program product is provided for adding cooperative file coloring protocols in a data deduplication system in a data deduplication system using a processor device, in a computing environment. The computer-readable storage medium has computer-readable program code portions stored thereon. The computer-readable program code portions include a first executable portion that represents a preferred character for file coloring in a file using a code selected from a multiplicity of codes that represent a variety of contexts. The original meaning of the preferred character is retained when representing the preferred character for the file coloring by the code selected from the multiplicity of codes.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
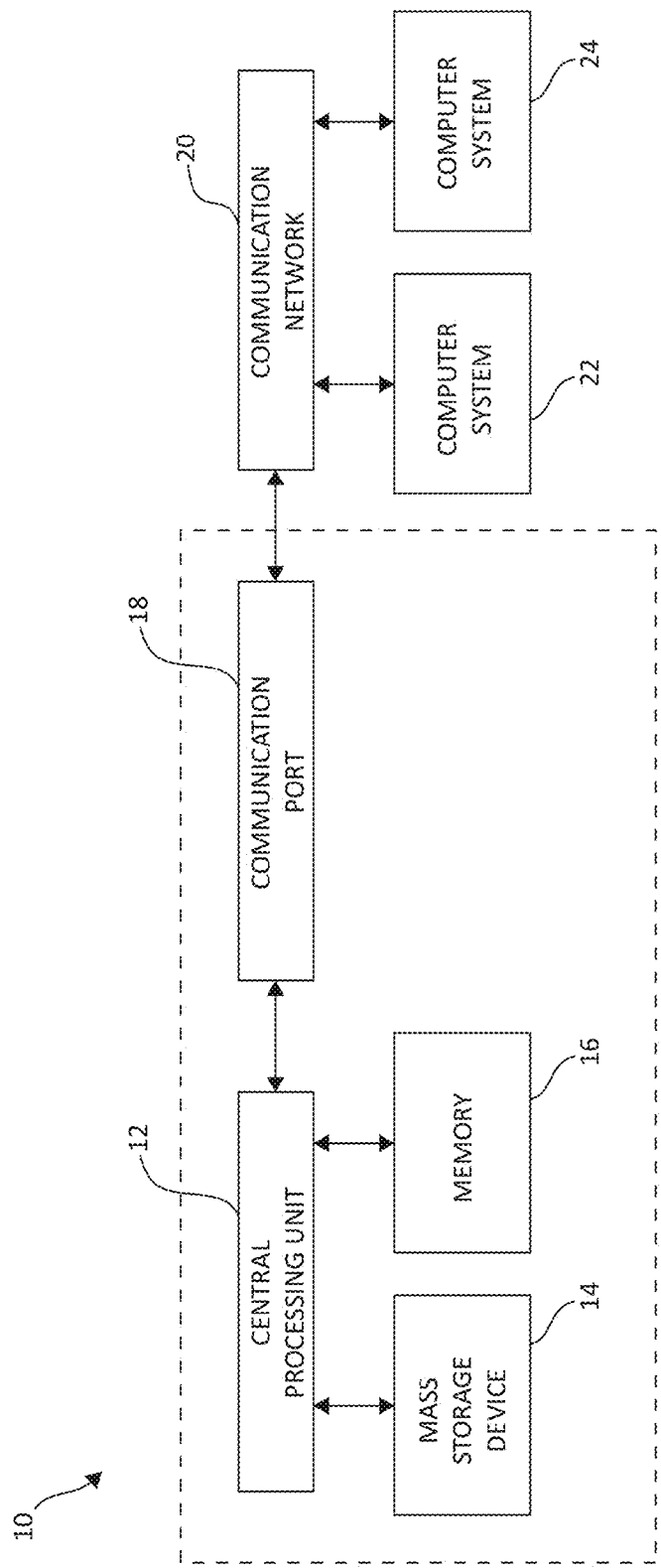
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

In one embodiment, deduplication operations per a given file generation assist in finding identical and/or similar data blocks among the given file generations. However, one problem is determining how to recognize, classify, and/or associate incoming backup data with previous generations of the incoming backup data respective files, which may already exist already in the repository, as the data arrives as a stream. In one embodiment, some form of hashes as the files' signatures may be used to recognize, classify, and/or associate incoming backup data with previous generations of the incoming backup data respective files, and/or employ a ContextWare® technique to identify the same. The ContextWare® technology helps one classify files per the file types. Per type classification allows for faster search yet, two files of the same type might have completely different content. Some deduplication solutions opt for ignoring the meta-data of the incoming stream such as: file-type, owners, length etc., because such an information is lost in a multi-stream backup environment. In one embodiment, the backup applications' headers are recognized and skipped thereby allowing to keep the user data itself intact and not fragmented (e.g., by using IBM®'s ProtecTIER technology). However, a need exists to use some form of signature to identify similar and/or identical files besides using hashes values as signatures. Indexing and searching of hash values even in a BTREE formation, is costly and computing efficiency is reduced. Providing the means to cluster at a higher level of granularity (beyond the per file type) of related hash values together increases deduplication functionality and performance.

As such, the present invention provides a solution to cluster at a higher level of granularity (beyond the per file type) of related hash values together by adding cooperative file coloring protocols in a data deduplication system using a processor device in a computing environment. In one embodiment, by way of example only, a preferred character is represented for file coloring in a file using a code selected from a multiplicity of codes that represent a variety of contexts. The original meaning of the preferred character is retained when representing the preferred character for the file coloring by the code selected from the multiplicity of codes. By adding some unique coloring to each file, files which bear similar and/or identical colors may be classified together thereby allowing for matching new input data (colored) with the reference colored data.

For example, assume that a backup data domain is text files (as opposed to compressed or encrypted files and/or binary files). A most popular and/or a preferred characters used by all computing languages is the "space" character. As such, the "space" character (e.g., the most popular character and/or preferred character) is represented for file coloring in a file using a code selected from a multiplicity of codes that represent a variety of contexts. Using the "space" character is just an example as any widely used (e.g., popular and/or preferred) character may be considered for the purpose of file coloring. In one embodiment, the present invention allows an assortment of binary-codes (and/or unused Unicode, and/or any other extended code) to represent a preferred and/or popular character (e.g., the "space" character). The assortment of codes may include at least plane code (e.g., Unicode). In Unicode standard, planes are groups of numerical values (code points) that point to specific characters. Unicode code points are logically divided into 17 planes, each with 65,536 ($=2^{16}$) code points. Planes are identified by the numbers 0 to $16_{decimal}$, which corresponds with the possible values 00-10$_{hexadecimal}$ of the first two positions in six position format (hhhhhh). At least six of these planes have assigned code points (characters), and are named. In one embodiment, about ten percent of the potential space is used. Furthermore, ranges of characters have been tentatively mapped out for every current and ancient writing system (script) the Unicode consortium has been able to identify. While Unicode may eventually need to use another of the spare 11 planes for ideographic characters, other planes remain. Even if previously unknown scripts with tens of thousands of characters are discovered, the limit of 1,112,064 code points is unlikely to be reached. The odd-looking code points limit (it is not a power of 2) is due to the design of UTF-16. In UTF-16 a "surrogate pair" of two 16-bit words is used to encode $2^{20}$ in the planes 1 to 16, in addition to the use of single code unit to encode plane 0. It is not due to Unicode transformation format (UTF) UTF-8, which is designed with a limit of $2^{31}$ code points (32768 planes), and can encode $2^{21}$ code points (32 planes) even if limited to 4 bytes.

Moreover, as part of the Unicode, a basic multilingual plane, supplementary multilingual plane, supplementary ideographic plane, unassigned planes, supplementary special-purpose planes, and/or private use area planes may also be used. For the "Basic Multilingual Plane" each numbered box represents 256 code points. The first plane, plane 0, of the Basic Multilingual Plane (BMP), is where most characters have been assigned. The BMP contains characters for almost all modern languages, and a large number of special characters. A primary objective for the BMP is to support the unification of prior character sets as well as characters for writing. Most of the allocated code points in the BMP are used to encode Chinese, Japanese, and Korean (CJK) characters. The High Surrogates (U+D800 . . . U+DBFF) and Low Surrogate (U+DC00 . . . U+DFFF) codes are reserved for encoding non-BMP characters in UTF-16 by using a pair of 16-bit codes: one High Surrogate and one Low Surrogate. A single surrogate code point will never be assigned a character. For the Supplementary Multilingual Plane, Plane 1, the Supplementary Multilingual Plane (SMP), is mostly used for historic scripts such as Linear B, and is also used for musical and mathematical symbols. For "Supplementary Ideographic Plane." Plane 2, the Supplementary Ideographic Plane (SIP), is used for CJK Ideographs, mostly CJK Unified Ideographs that were not included in earlier character encoding standards. For "Unassigned planes," Planes 3 to 13: No characters have yet been assigned to Planes 3 through 13. Plane 3 is tentatively named the Tertiary Ideographic Plane, but there may not be any characters assigned to it. It is reserved for Oracle Bone script, Bronze Script, Small Seal Script, additional CJK unified ideographs, and other historic ideographic scripts. It is not anticipated that all these planes will be used, given the total sizes of the known writing systems left to be encoded. The number of possible symbol characters that could arise outside of the context of writing systems is potentially large. At the moment, these 11 planes out of 17 are unused. For "Supplementary Special-purpose Plane," Plane 14 (E in hexadecimal), the Supplementary Special-purpose Plane (SSP), may contain non-graphical characters. The first block is for deprecated language tag characters for use when language cannot be indicated through other protocols (such as the xml:lang attribute in XML). The other block contains glyph variation selectors to indicate an alternate glyph for a character that cannot be determined by context. For Private Use Area planes, the two planes 15 and 16, called Supplementary Private Use Area-A and -B (or simply Private Use Area (PUA)) are available for character assignment by parties outside the ISO and the Unicode Consortium, and they are used by fonts internally to refer to auxiliary glyphs, for example, ligatures and building blocks for other glyphs. Such characters will have limited interoperability. Software and fonts that support Unicode will not necessarily support character assignments by other parties.

Using the file coloring, the present invention provides for a backup application (e.g., IBM® Tivoli Storage Manager "TSM") to add yet another metadata field, to be called file-color, to the database. In one embodiment, prior to sending a file to a storage device (e.g., a Virtual Tape Library "VTL"), the backup application may change all instances of a preferred character (and/or a most popular and/or preferred character, a second most popular and/or preferred character, and/or an nth most popular and/or preferred character) (e.g., all instances of the "space" character) in the respective file to its colored-space. At a time for restoring the file coloring back to the original preferred character, the backup application will search for the file's colored-space and convert the code representing the preferred character back to the preferred character (e.g., plain/stock "space" the users' application expects). By having a cooperative file color-protocol between the backup application and the storage device (e.g., the VTL) allows a data deduplication component on the storage device (e.g., the VTL) to easily focus on the right elements in the repository when looking for duplicates files, data chunks, and/or similarity elements (e.g., hash values generated from a data deduplication operation). It should be noted as the storage device (e.g., the VTL) receive streams of bytes its ability to keep track of the file context is limited. Yet, the present invention provides for the file coloring to be embedded in the data stream and thus, the storage device (e.g., the VTL) is always aware of the file coloring while processing that file data chunks. Moreover, a colored file, where the color is spread across the whole stream, assists the backup system to handle multi-stream embodiments. This is because as each data stream, which may be handled by a different processes and/or threads, the data deduplication and/or backup application still recognizes the file color even at the fragment level, unlike a case where the information (e.g., the ContextWare information) is embedded just at the header level. The file coloring scheme may take various shapes. For example, in one embodiment, the file coloring may have different colors for different servers, different file-colors per the files' owners and/or application type, and/or different file coloring based upon user preferences. It should be noted that even if the number of file coloring options are limited, the ability to color a file simply by file-type assists in the case of multi-streaming as the color is embedded in all file's chunks, regardless of the stream they arrive on.

Thus, in one embodiment, the present invention provides a solution for file coloring a file in a data deduplication system by representing a preferred character (e.g. whitespace) in a file using a code selected from a variety of codes, where the variety of codes represents a variety of contexts (e.g., metadata, file type, authorship, ownership, and the like.) For example, as relating to the code representing the context, a backup-server may choose to classify files by file types. For instance, all IBM® DB2 files could have one color and all ORACLE® (another data-base type) files can be assigned another color. It is the backup-server prerogative to decide what it is that the backup-server wants to group together. Another probable grouping could be of files by the file's owners such that all of a first users files have one color and a second users files have another color. Such a grouping is beneficial and increases computing efficiency if it is was found that any given user tends to recycle/reuse the same data in the user's own files and as such deduplication efforts should be done on per users' files basis.

Furthermore, the preferred character is represented using the code such that the representation retains an original meaning of the character. In one embodiment, the present invention identifies similarities between data chunks encoded using the aforementioned coding scheme by comparing the metadata represented by the Unicode characters and performing deduplication based on the level of similarity. Thus, in one embodiment, by using the file coloring the need for identifying a start point and/or an end point is eliminated and there is no need to add metadata for the file coloring. The present invention "simply" colors the incoming data stream without any effort to identify those crucial data points (e.g., the start point and/or the end point).

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
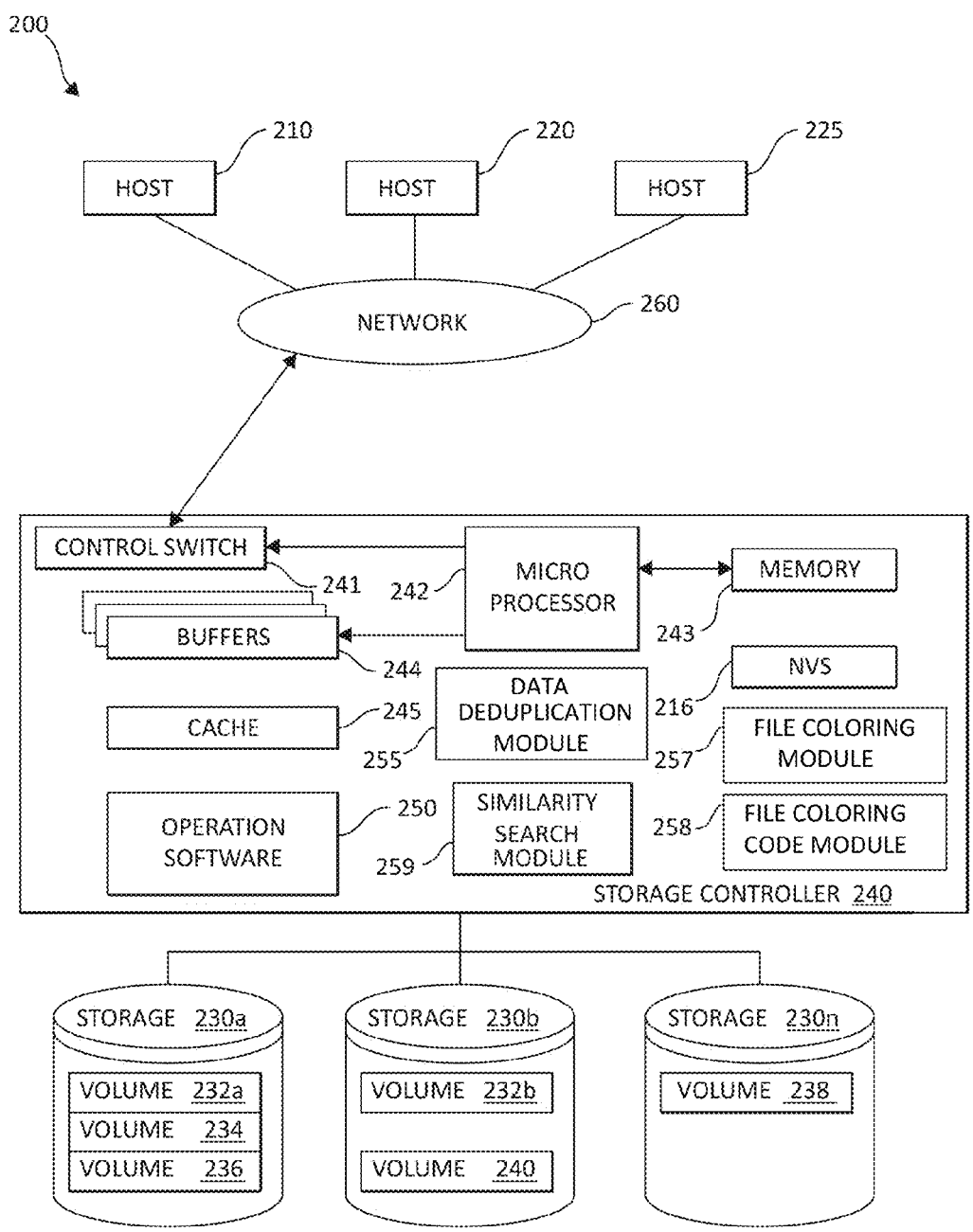
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a file coloring module 257, a file coloring code module 258, and a similarity search module 259. The data duplication module 255, the file coloring module 257, the file coloring code module 258, and the similarity search module 259 may work in conjunction with each and every component of the storage controller 240, the hosts 210, 220, 225, and storage devices 230. The data duplication module 255, the file coloring module 257, the file coloring code module 258, and the similarity search module 259 may be structurally one complete module or may be associated and/or included with other individual modules. The data duplication module 255, the file coloring module 257, the file coloring code module 258, and the similarity search module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the file coloring module 257, the file coloring code module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the file coloring module 257, the file coloring code module 258, and the similarity search module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the file coloring module 257, the file coloring code module 258, and the similarity search module 259 may also be located in the cache 245 or other components. As such, the data duplication module 255, the file-coloring module 257, the file coloring code module 258, and the similarity search module 259 maybe used as needed, based upon the storage architecture and users preferences.

Figure 3:
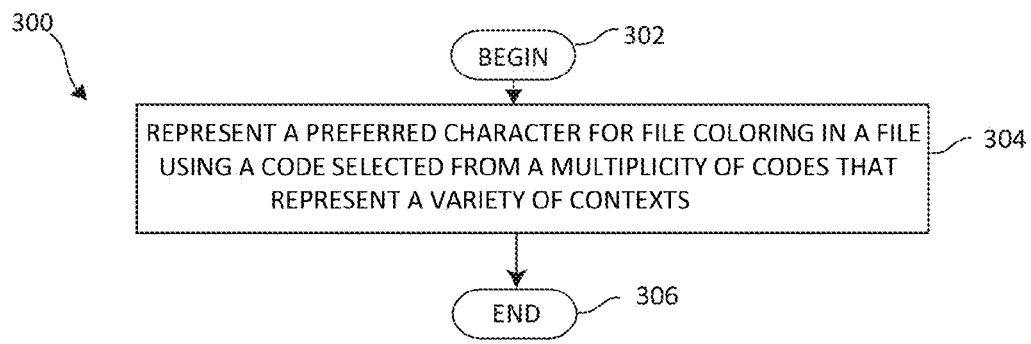
FIG. 3 is a flowchart illustrating an exemplary method for adding cooperative file coloring protocols in a data deduplication system in which aspects of the present invention may be realized.

Turning now to FIG. 3, a flowchart illustrating an exemplary method 300 for adding cooperative file coloring protocols in a data deduplication system in which aspects of the present invention may be realized, is depicted. The method 300 begins (step 302). The method 300 represents a preferred character for file coloring in a file using a code selected from a multiplicity of codes that represent a variety of contexts (step 304). The original meaning of the preferred character is retained when representing the preferred character for the file coloring by the code selected from the plurality of codes. The method 300 ends (step 306).

As such, the present invention may cluster together the same-color files together. By providing a means, at a higher level of granularity (beyond the per file type) of related hash values, to cluster files together by adding cooperative file coloring protocols in a data deduplication system assists to increase the functionality and performance of the deduplication system. In one embodiment, by way of example only, a preferred character is represented for file coloring in a file using a code selected from a multiplicity of codes that represent a variety of contexts. The original meaning of the preferred character is retained when representing the preferred character for the file coloring by the code selected from the multiplicity of codes. By adding some unique coloring to each file, files which bear similar and/or identical colors may be classified together thereby allowing for matching new input data (colored) with the reference colored data. The embodiments described herein are transparent to the servers and users' applications and provides significant advantages for increasing the efficiency in data deduplication in the adoption of such techniques. By the embodiments described herein, if a higher level application adheres to a new file-color protocol/standard it will help the deduplication operation identify similar files (those that originated from the same file), as the file-color will be retained throughout the files' life time.

For example, consider the example above, where the "space" character is the preferred choice for file coloring purposes. In the case of text files, a few assumptions are revealed: 1) the "space" character is expected to be the most used character in any text file, and 2) the distribution and/or usage of the "space" characters are expected to be evenly distributed across the entire file, and thus is likely to be found in any reasonable data chunk of the respective file. In the case of binary files the most "popular" character may be any arbitrary character. If indeed, in one embodiment, it is possible to identify a most popular character in a binary file (e.g., a character that its number of appearances in a file is significantly larger by comparison than any other character and also that is evenly spread a cross the file) then that character can be considered the file color, without resorting to any color table standard. The backup storage device (e.g., the VTL) may then cluster all files according to the data chunks/files inherent colors in clusters so, that the search for duplicates can be carried out at least first, against the file's respective color group, and if and only if, that search doesn't produce a most similar match then to look for matches in other clusters.

Moreover, if it is still desired to use a color table for binary files as is done for text files then finding the right color for a "binary" file (where there is no way to know before hand which character is not used) might require an extra phase to ensure that the new-color is indeed available. In other words, in the case of binary files, no particular pattern and/or character is invalid. Thus, it is required to traverse the entire file and map all used-up patterns and only those patterns that are not found may be used as the file-color by changing the most popular character with the unused pattern that turns into the file color. The case might even be that over the lifetime of a file the file's colors changes because a character that was previously "free" turned to be taken in one of its generations. In other words, the file colors may change because a pattern that was not included in the binary file's early generations can all of a sudden appear, and as such, force a need to find a new unused pattern. Such a scenario diminishes the effectiveness of the specific-file-color as old generations will not be matched with newer generation of the same color. If a given pattern (which was not found in the original binary file) appears in the new file data, then the pattern that was used as a color cannot be used as color anymore and new color has to be found from the still unused patterns. The possibility of coloring binary provides for completeness for file coloring. Another approach to address the possibility of file-color change is to create a class of related colors so that if a given color is not available anymore the next color for the file will be picked from the pre-configured color class. For example, the colors Black and Blue may be assigned in the same class (e.g., colors with B being their first character are assigned to a class). If the original file-color was Blue and then the file color was found to turn into a valid data and as such not available, then the new color would be changed to Black. Upon, looking in a data repository, the computing system will look plausibly first for files with Blue color and then with Black color. Another variation of the file-coloring may be multi-level where the prefix of the "color" classifies the file type (such as DB2 or WORD-PRO and the like) and the rest of the color will be allowed to associate the file with particular user/owner and/or file-name and, so on and so forth.

Figure 4:
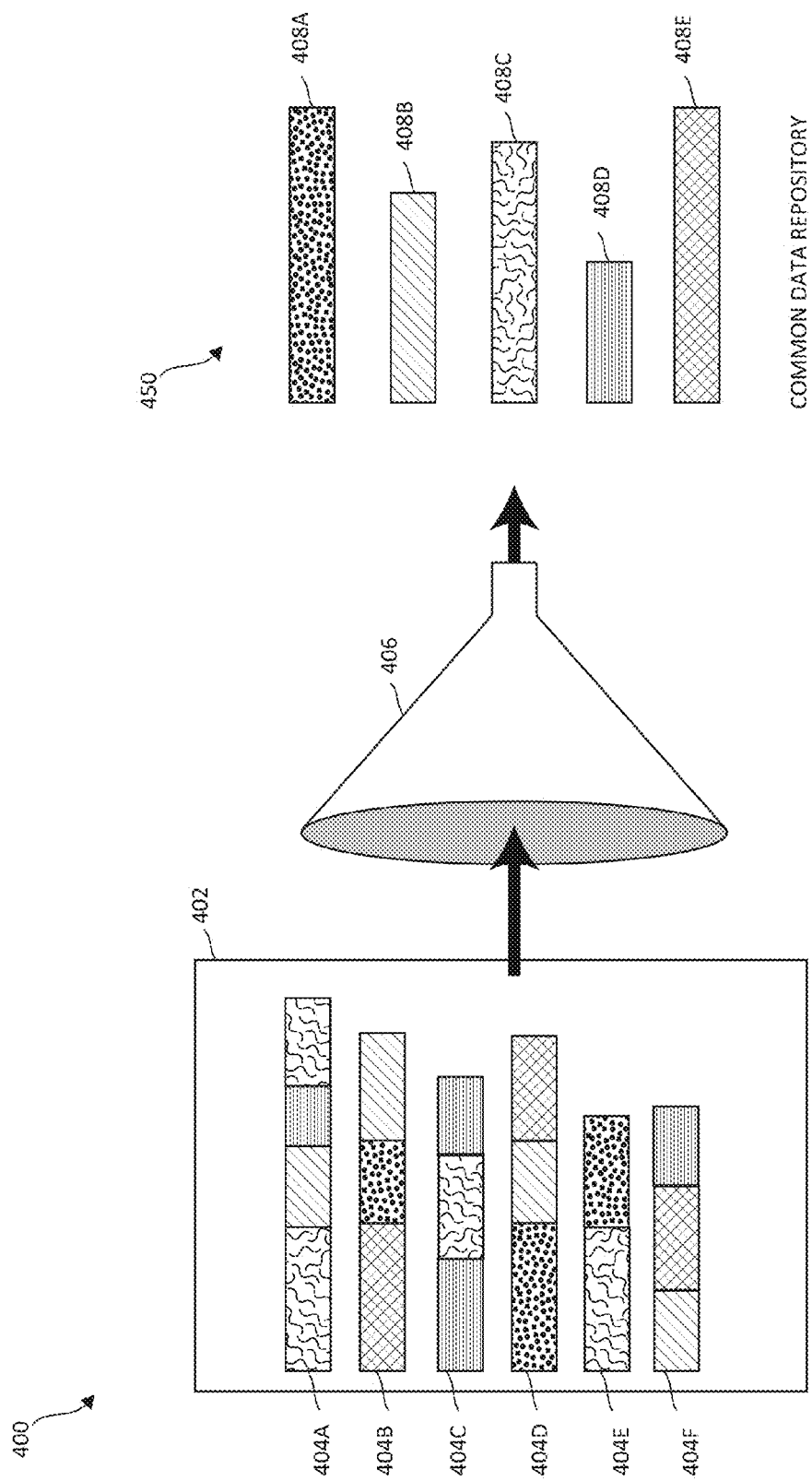
FIG. 4 is a block diagram illustrating a data deduplication system with added cooperative file coloring protocols in in which aspects of the present invention may be realized.

FIG. 4 is a block diagram illustrating a data deduplication system with added cooperative file coloring protocols in which aspects of the present invention may be realized. FIG. 4 illustrates the deduplication operations reducing the amount of duplicate data being backed up and then stored by identifying and eliminating common data in and across the backup storage system using the file coloring protocols. Files in a backup job application 402 are illustrated with six data streams 404 (shown in FIG. 4 as 404A-F). Each data stream 404 includes various data chunks having a preferred character represented for file coloring for a file using a code selected from a multiplicity of codes that represent a variety of contexts. The original meaning of the preferred character is retained when representing the preferred character for the file coloring by the code selected from the multiplicity of codes. By adding some unique coloring to each file and embedding the file coloring in the data streams for each data chunk, files which bear similar (e.g., same prefix pattern are considered as similar bearing in mind that deduplication is most probable between various generation of the same file and not various generations of similar files) and/or identical colors may be classified, using the classification module 406 together, with the classified results seen in the common data repository 450, thereby allowing for matching new input data (colored) with the reference colored data. In the common data repository 450, data chunks 408A having a first selected file coloring are matched and stored together with other similarly file colored data chunks 408A from each of the data streams 404A-F having the first selected file coloring. In the common data repository 450, data chunks 408B having a second selected file coloring are matched and stored together with other similarly file colored data chunks 408B from each of the data streams 404A-F having the second selected file coloring. In the common data repository 450, data chunks 408C having a third selected file coloring are matched and stored together with other similarly file colored data chunks 408C from each of the data streams 404A-F having the third selected file coloring. In the common data repository 450, data chunks 408D having a fourth selected file coloring are matched and stored together with other similarly file colored data chunks 408D from each of the data streams 404A-F having the fourth selected file coloring. In the common data repository 450, data chunks 408E having an nth selected file coloring are matched and stored together with other similarly file colored data chunks 408E from the other data streams having the nth selected file coloring. Thus, by the file coloring, the ability to color a file simply by file-type assists in the case of multi-streaming 404A-F as the color is embedded in all file's chunks 408, regardless of the data stream 404 they arrive on. Moreover, each of the data chunks assembled together from each separate data stream based on the file coloring may also be matched and stored with existing files having similar file coloring that have previously been stored. By identifying similarities of the file coloring between chunks of data encoded using the aforementioned coding scheme by comparing the contexts represented by the Unicode characters the files/data chunks 408 may be deduplicated based on the level of similarity of the file coloring.

Figure 5:
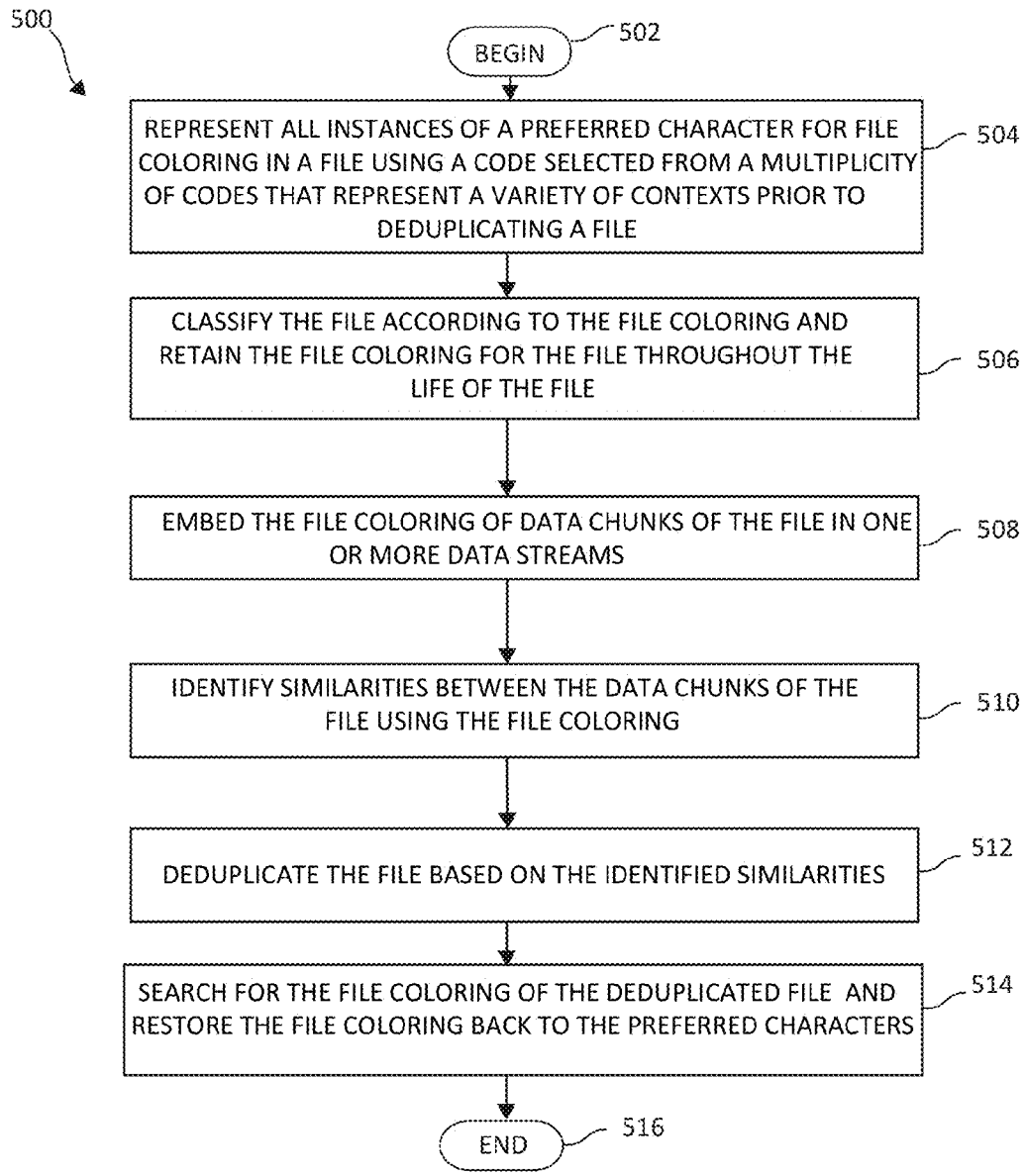
FIG. 5 is a flowchart illustrating an exemplary alternative method for adding cooperative file coloring protocols in a data deduplication system in which aspects of the present invention may be realized.

FIG. 5 is a flowchart illustrating an exemplary method 500 for adding cooperative file coloring protocols in a data deduplication system in which aspects of the present invention may be realized. The method 500 begins (step 502). The method 500 represents all instances of a preferred character for file coloring in a file using a code selected from a multiplicity of codes that represent a variety of contexts prior to deduplicating a file (step 504). The method 500 classifies the file according to the file coloring and retains the file coloring for the file throughout the life of the file (step 506). The method 500 embeds the file coloring of data chunks of the file in one or more streams (e.g., if the data chunks of a file are sent in different streams the file colors for the data chunks are embedded in each data stream) (step 508). Similarities between the data chunks of the file are identified using the file coloring (step 510). The method 500 deduplicates the file based on the identified similarities (e.g., deduplicates the file after locating the file based on the file coloring (step 512). The purpose of coloring a file is to allow the system to locate quicker the relevant files/data in a repository where common pieces are likely to be found (using hash values). At the time the file needs to be restored, the method 500 searches for the file coloring of the deduplicated file and restores the file coloring back to the preferred characters (step 514). The method 500 ends (step 516).

At this point, it should be noted that the file coloring further adds an extension to the similarity hash that is generated as a part of a deduplication operation (e.g., IBM of ProtecTIER deduplication). In other words it is possible there could be multiple backup servers/programs used against the repository, and a file color might bear the file color and/or file name of the program which actually did the backup so as to look for other data in the repository backed up by that particular server as it is not likely that the very data is backed up by different services. For example, in one embodiment, during the deduplication operation (e.g., IBM's ProtecTIER deduplication) distinguishing characteristics (e.g., similarity elements) may be generated. Thus, these distinguishing characteristics (e.g., similarity elements) may be tagged with a least significant "coloring" and/or whatever size is deemed necessary. The file coloring codes the data source and/or format. In the examples above, file system versus network data management protocol (NDMP) backup and client that the backup originated from. Then, when new data arrives and the similarity search structure is searched for the new data's most similar data stored in the similarity search structure (e.g., a similarity index) and this file coloring is used as a tie breaker in the event that an input distinguishing characteristic matches more than one repository (existing) distinguishing characteristic. In this way, a new NDMP backup would favor deduplicating using an older NDMP Network Data Management Protocol backup as its reference rather than a file system backup of the same data, and a new backup of a virtual machine (VM) would favor using the previous version of the same VM rather than some arbitrary VM that happens to have the same files but laid out differently. Thus, the file coloring in a data deduplication operations extends the file coloring to be based on origin and protocol, and provides an implementation outline without modifying the data.

Figure 6:
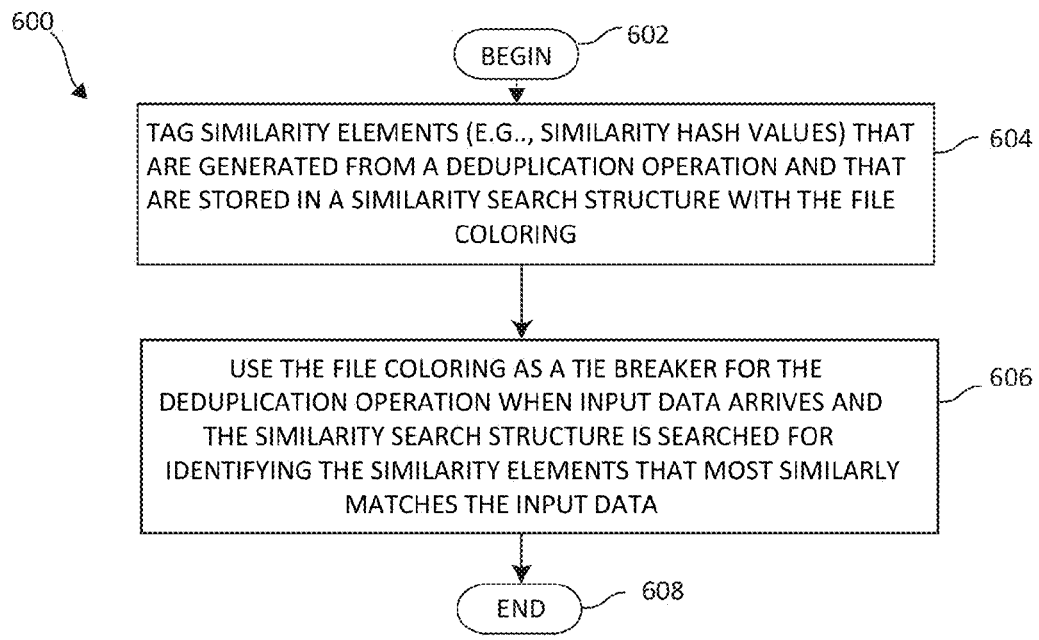
FIG. 6 is a flowchart illustrating an exemplary method for identifying input data in a repository using the file coloring in a data deduplication system in which aspects of the present invention may be realized.

FIG. 6 is a flowchart illustrating an exemplary method 600 for identifying input data in a repository using the file coloring in a data deduplication system in which aspects of the present invention may be realized. The method 600 begins (step 602). The method 600 tags similarity elements (e.g., similarity harsh values) generated from a deduplication operation and that are stored in the similarity search structure with the file coloring (step 604). The method 600 uses the file coloring as a tie breaker for the deduplication operation when input data arrives and the similarity search structure is searched for identifying the similarity elements that most similarly matches the input data (step 606). The method 600 ends (step 608).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for adding cooperative file coloring protocols in a data deduplication system using a processor device in a computing environment, comprising:

representing, by the processor device of the data deduplication system, a preferred character for file coloring in a file of a backup application using a code selected from a plurality of codes that represent a plurality of contexts, the contexts including at least metadata, a file type, a file authorship, and a file ownership of the file; wherein an original meaning of the preferred character is retained when representing the preferred character for the file coloring by the code selected from the plurality of codes;

classifying the file according to the file coloring;

retaining the file coloring for the file throughout the life of the file; and deduplicating the file by the data deduplication system according to the file coloring that represents a source file of the backup application.

2. The method of claim 1, further including embedding the file coloring of data chunks of the file in at least one of a plurality of data streams, wherein the file coloring includes at least one of a plurality of shapes, a plurality of colors for one of a plurality of servers, a plurality of file owners, and a plurality of applications.

3. The method of claim 1, further including identifying similarities between the data chunks of the file using the file coloring.

4. The method of claim 1, further including setting as the preferred character one of a most used character, a second most used character, and an nth most used character.

5. The method of claim 1, further including performing one of:

creating a class of related codes from the plurality of codes for file coloring, and selecting an alternative code from the plurality of codes if the selected code from the plurality of codes is unavailable.

6. The method of claim 1, further including performing one of:
representing each instance of the preferred character in the file for the file coloring, wherein the cooperative file coloring protocols are established between backup applications and data deduplication systems, and
restoring the preferred character to the original meaning by removing the file coloring.

7. The method of claim 1, further including identifying data chunks of the file sent across a plurality of data streams by the file coloring.

8. The method of claim 1, further including performing one of:
tagging similarity elements generated from a deduplication operation and that are stored in a similarity search structure with the file coloring, and
using the file coloring as a tie breaker for the deduplication operation when input data arrives and the similarity search structure is searched for identifying the similarity elements that most similarly matches the input data.

9. A system for adding cooperative file coloring protocols in a data deduplication system of a computing environment, the system comprising:
the data deduplication system;
a repository in the data deduplication system;
a similarity search structure in association with the repository and the data deduplication system; and
at least one processor device operable in the computing environment for controlling the data deduplication system, wherein the at least one processor device:
represents, by the processor device of the data deduplication system, a preferred character for file coloring in a file of a backup application using a code selected from a plurality of codes that represent a plurality of contexts, the contexts including at least metadata, a file type, a file authorship, and a file ownership of the file; wherein an original meaning of the preferred character is retained when representing the preferred character for the file coloring by the code selected from the plurality of codes,
classifies the file according to the file coloring,
retains the file coloring for the file throughout the life of the file, and
deduplicates the file by the data deduplication system according to the file coloring that represents a source file of the backup application.

10. The system of claim 9, wherein the at least one processor device embeds the file coloring of data chunks of the file in at least one of a plurality of data streams, wherein the file coloring includes at least one of a plurality of shapes, a plurality of colors for one of a plurality of servers, a plurality of file owners, and a plurality of applications.

11. The system of claim 9, wherein the at least one processor device identifies similarities between the data chunks of the file using the file coloring.

12. The system of claim 9, wherein the at least one processor device sets as the preferred character one of a most used character, a second most used character, and an nth most used character.

13. The system of claim 9, wherein the at least one processor device performs one of:
creating a class of related codes from the plurality of codes for file coloring, and
selecting an alternative code from the plurality of codes if the selected code from the plurality of codes is unavailable.

14. The system of claim 9, wherein the at least one processor device performs one of:
representing each instance of the preferred character in the file for the file coloring, wherein the cooperative file coloring protocols are established between backup applications and data deduplication systems, and
restoring the preferred character to the original meaning by removing the file coloring.

15. The system of claim 9, wherein the at least one processor device identifies data chunks of the file sent across a plurality of data streams by the file coloring.

16. The system of claim 9, wherein the at least one processor device performs one of:
tagging similarity elements generated from a deduplication operation and that are stored in the similarity search structure with the file coloring, and
using the file coloring as a tie breaker for the deduplication operation when input data arrives and the similarity search structure is searched for identifying the similarity elements that most similarly matches the input data.

17. A computer program product for adding cooperative file coloring protocols in a data deduplication using a processor device in a computing environment, the computer program product comprising a computer-readable storage medium having computer-readable program code portions stored therein, the computer-readable program code portions comprising:
a first executable portion that represents, by the processor device of the data deduplication system, a preferred character for file coloring in a file of a backup application using a code selected from a plurality of codes that represent a plurality of contexts, the contexts including at least metadata, a file type, a file authorship, and a file ownership of the file; wherein an original meaning of the preferred character is retained when representing the preferred character for the file coloring by the code selected from the plurality of codes;
classifies the file according to the file coloring;
retains the file coloring for the file throughout the life of the file; and
deduplicates the file by the data deduplication system according to the file coloring that represents a source file of the backup application.

18. The computer program product of claim 17, further including a second executable portion that embeds the file coloring of data chunks of the file in at least one of a plurality of data streams, wherein the file coloring includes at least one of a plurality of shapes, a plurality of colors for one of a plurality of servers, a plurality of file owners, and a plurality of applications.

19. The computer program product of claim 17, further including a second executable portion that identifies similarities between the data chunks of the file using the file coloring.

20. The computer program product of claim 17, further including a second executable portion that sets as the preferred character one of a most used character, a second most used character, and an nth most used character.

21. The computer program product of claim 17, further including a second executable portion that performs one of:
creating a class of related codes from the plurality of codes for file coloring, and selecting an alternative code from the plurality of codes if the selected code from the plurality of codes is unavailable.

22. The computer program product of claim 17, further including a second executable portion that performs one of:
representing each instance of the preferred character in the file for the file coloring, wherein the cooperative file coloring protocols are established between backup applications and data deduplication systems, and
restoring the preferred character to the original meaning by removing the file coloring.

23. The computer program product of claim 17, further including a second executable portion that identifies data chunks of the file sent across a plurality of data streams by the file coloring.

24. The computer program product of claim 17, further including a second executable portion that performs one of:
tagging similarity elements generated from a deduplication operation and that are stored in the similarity search structure with the file coloring, and
using the file coloring as a tie breaker for the deduplication operation when input data arrives and the similarity search structure is searched for identifying the similarity elements that most similarly matches the input data.

* * * * *